Jan. 20, 1970
W. M. HOUSE
3,490,151
ROTARY TABLE
Filed June 30, 1966
2 Sheets-Sheet 1
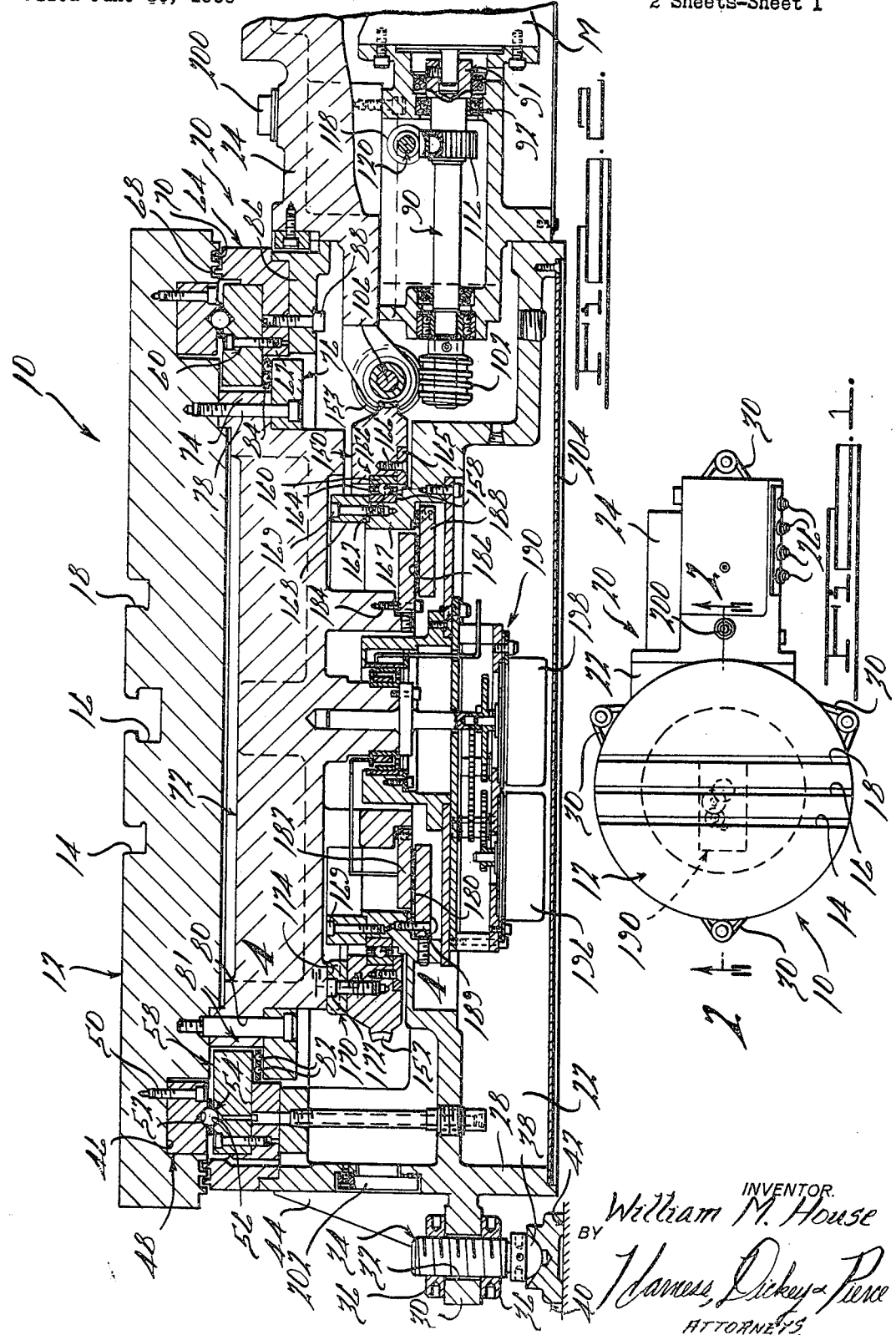
INVENTOR.
William M. House
BY Harness, Dickey & Pierce
ATTORNEYS

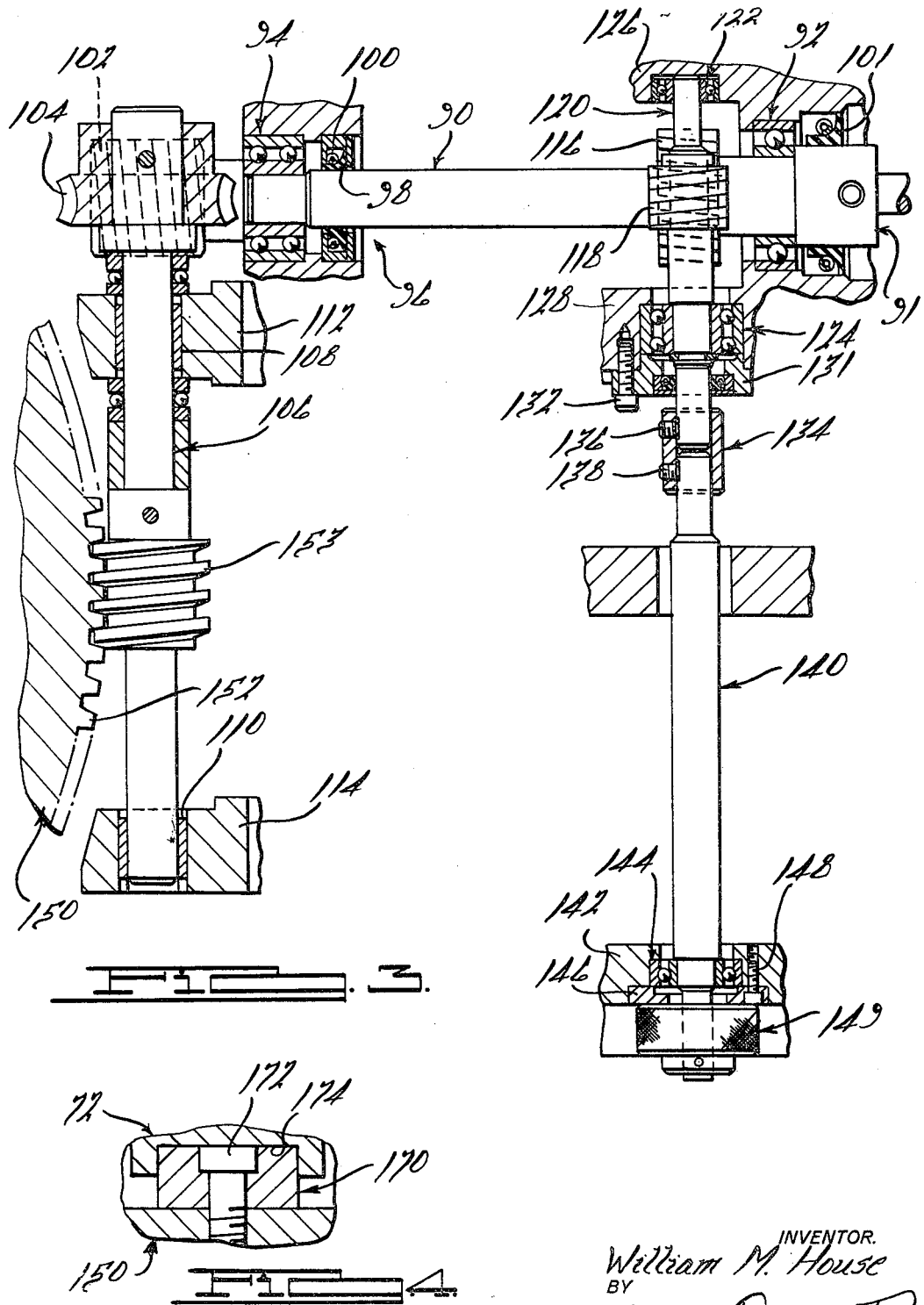

United States Patent Office

3,490,151
Patented Jan. 20, 1970

3,490,151
ROTARY TABLE
William M. House, Allen Park, Mich., assignor to Machine Products Corporation, Detroit, Mich., a corporation of Michigan
Filed June 30, 1966, Ser. No. 561,904
Int. Cl. G01b 5/24
U.S. Cl. 33—174        2 Claims

ABSTRACT OF THE DISCLOSURE

A rotary table adapted for use in precision angle measurement and comprising a drive linkage between the support platform and a drive motor for minimizing to the extreme any eccentricity in the rotation of the support platform; the drive linkage comprising a ring gear disposed coaxially of the support platform and provided with keyway means adapted to be received within complementary-shaped recess means on the support platform, whereby rotation of the ring gear will impart rotary movement to the support platform.

---

This invention relates generally to angle measuring equipment and, more particularly, to a rotary table adapted to be used as a precision angle sensing or measuring device.

The continuously increasing use of precision equipment in vehicular propulsion, control and navigation systems, as well as a miriad of other applications, has resulted in an acute need for precision angle measuring equipment which may, for example, be used for checking gears, bearings, optical equipment and the like. Such equipment must be capable of measuring angles in the order of one arc second, and frequently in the order of a fraction of an arc second.

One particular problem which has been encountered in the construction of angle measuring equipment heretofore known and used resides in the difficulty in imparting rotary motion to the equipment support platforms or tables upon which the apparatus being measured is mounted. In particular, difficulty has arisen in imparting rotary movement to the support platforms without creating any rotational axis eccentricity or wobble, and since it is imperative that the axes of rotation of the supported platforms be as true as physically possible during the angle measuring process, such eccentricity and/or wobble has frequently resulted in erroneous if not completely unreliable angle measurement values. The primary source of axis deviation of the rotary support platforms or tables has been the rotary drive means which have usually been in the form of precision worm gears drivingly connected to the periphery of the tables. Accordingly, the accuracy of such heretofore known and used angle measuring devices has been limited to the degree of accuracy of the drive gears utilized for rotating the platforms.

The present invention is directed toward a new and improved rotary table adapted to be used in precision angle measuring as above described. The table is provided with a novel drive means which overcomes many of the problems of similar type measuring devices previously used. In particular, the rotary table of the present invention is provided with a novel drive linkage between the support platform and the drive motor which minimizes to the extreme the possibility of any eccentricity of the rotational axes of the platform. Accordingly, the rotary table of the present invention may be used to measure arc angles down to a fraction of an arc second, with the only limitation of accuracy being in the actual position sensing mechanism incorporated therewith, as opposed to the accuracy limitation imposed by the drive gears as has been the case in previously used angle measuring equipment.

It is accordingly a primary object of the present invention to provide a new and improved apparatus for use in the precision measurement of arc angles.

It is a more particular object of the present invention to provide a new and improved rotary table which embodies a novel drive means for selectively rotating the support platform thereof, which drive means is adapted to minimize to the extreme any eccentricity imposed on the rotational axis of the support platform.

It is another object of the present invention to provide an improved rotary table of the above character wherein the drive means comprises a drive ring gear disposed coaxially of the rotary support platform and which is drivingly connected to the platform by means of a novel keyway arrangement.

It is still another object of the present invention to provide a new and improved rotary table of the above character which is of a relative simple design, is easy to assemble and economical to commercially manufacture.

Other objects and advantages of the present invention will become apparent from the following detailed description taken in conjunction with the accompanying drawings, wherein:

FIGURE 1 is a top plan view of a rotary table in accordance with an exemplary embodiment of the present invention;

FIGURE 2 is an enlarged fragmentary cross-sectional view of the rotary table illustrated in FIGURE 1, as taken substantially along the line 2—2 thereof;

FIGURE 3 is an enlarged fragmentary cross-sectional view of a portion of the drive mechanism incorporated in the rotary table of the present invention; and FIGURE 4 is an enlarged fragmentary cross-sectional view of a portion of the structure illustrated in FIGURE 2, as taken substantially along the line 4—4 thereof.

Referring now to the drawings, a rotary table 10, in accordance with an exemplary embodiment of the present invention, is shown as comprising a flat, horizontally extending annular support platform 12 that is formed with a plurality of substantially diametrically extending mounting grooves 14, 16 and 18 which are adapted to receive suitable retaining brackets or the like (not shown) for securing the apparatus which is to be angularly measured to the top of the platform 12.

The platform 12 is rotatably mounted on the top of a table housing, generally designated 20, which comprises an annular platform support section 22 and a control section 24 (see FIGURE 1), the latter of which is provided with a plurality of suitable actuating switches or the like 26 and electric drive motor M for selectively rotating or driving the platform 12 in the manner later to be described. The housing 20 is formed with annular vertically extending side section 28 and is provided with a plurality of outwardly extending mounting flange portions, generally designated 30. As best seen in FIGURE 2, each of the flange portions 30 is formed with a vertically extending bore 32 which is adapted to receive one of a plurality of mounting studs or legs 34. A pair of adjustable gland nuts or the like 36 are disposed on each of the legs 34, the nuts 36 being located directly above and below the flange portions 30 and being axially adjustable for lockingly securing the legs 34 in preselected positions with respect to the flange portions 30. With this construction, the legs 34 may be moved axially relative to the flange portions 30 for leveling the rotary table 10 of the present invention. The lower ends of the legs 34 are provided with substantially hemispherical foot members 38 which are adapted to be received within upwardly exposed recess portions formed in a plurality of base members 40 located one subjacent each of the legs 34. The base members 40 are adapted to be mounted on a suitable structure 42 which may, for example, be the top of a table or the like. The flange portions 30 are preferably integrally formed on the outer periphery of the housing 20, but alternatively, may be separate members and secured thereto by any suitable means such as screws, bolts or the like. Reinforcing webs 44 are also preferably integrally formed on the periphery of the housing 20 adjacent each of the flange portions 30 for strengthening the same.

As best seen in FIGURE 2, the lower side of the rotatable support platform 12 is formed with an annular recess 46 which is generally rectangular shaped in radial cross-section and has an upper bearing race 48 disposed therewithin. The bearing race 48 is fixedly mounted within the recess 46 by means of suitable vertically extending, circumferentially spaced mounting screws, bolts or the like 50. A generally V-shaped groove or recess 52 is formed in the lower side of the bearing race 48 and is adapted to at least partially receive a plurality of circumferentially spaced anti-friction ball bearings, generally designated 54. The bearings 54 are carried within a generally V-shaped groove 56 formed in the top of a lower bearing race member 58 which is fixedly secured by suitable screws, bolts or the like 60 to the upper surface of a radially inwardly extending shoulder portion 62 of an annular rim member 64 extending coaxially upwardly from the top of the housing side section 28. As best seen in FIGURE 2, the rim member 64 provides an upper extension of the housing side section 28. A suitable bearing cage member is preferably interposed between the lower side of the upper bearing race 48 and the upper surface of the lower bearing race 58 for preventing any relative circumferential movement of the ball bearings 54. A plurality of complementary lands 68 and grooves 70 are preferably formed around the lower outer edge of the support platform 12 and the upper edge of the rim member 64 for preventing the influx of any dust or other foreign material into the interior of the housing section 22.

Mounted coaxially of the support platform 12 on the lower side thereof is a central hub member, generally designated 72, which is formed with a radaially outwardly extending mounting shoulder 74 around the outer periphery thereof. An annular mounting ring 76 is fixedly secured to the lower side of the shoulder 74 by means of a plurality of circumferentially spaced, vertically extending screws, bolts or the like 78, which extend through suitable apertures 80 in the shoulder 74 and are threadably received within the lower side of the platform 12. It will be seen that the platform 12, hub member 72 and mounting ring 76 form an integral rotatable unit. A preload bearing assembly 81 comprising a plurality of ball bearings 82 and a bearing cage 84 is interposed between the upper surface of the mounting ring 76 and the lower surface of a radially inwardly extending portion 85 of the lower bearing race 58, the assembly 81 assuring that the aforesaid unit comprising the support platform 12, hub member 72 and mounting ring 76 is positively seated on the bearings 54 to provide for vibration free rotational movement of said unit. As illustrated in FIGURE 2, the housing side section 28 is formed with a radially inwardly extending portion 86 which underlies and supports the radially inwardly extending shoulder 62 of the rim member 64, which member 64 is secured to the portion 86 by means of suitable screws, bolts or the like 88.

Referring now to the means for transmitting rotary power from the drive motor M, as best seen in FIGURES 1 and 3, a drive shaft 90 extends longitudinally of the housing section 24 toward the housing section 22, which drive shaft 90 is drivingly connected to the motor M by means of a suitable coupling arrangement 91. The shaft 90 is rotatably mounted within suitable anti-friction bearing assemblies 92 and 94, and a suitable fluid seal 96 is provided adjacent the bearing assembly 94. The seal comprises suitable gasket means 98 and snap ring means 100 and functions to prevent any lubricant leakage around the shaft 90, as will be apparent. A similar type seal 101 is provided on the shaft 90 adjacent the coupling 91. The drive shaft 90 is provided with a gear member 102 on the end thereof opposite the coupling 91, the gear 102 being drivingly connected to another gear 104 which is fixedly mounted on a transversely extending shaft 106. As best illustrated in FIGURE 3, the shaft 106 is rotatably mounted within suitable anti-friction bushings 108 and 110 which are located within wall portions 112 and 114 of the housing section 24. The shaft 106 is drivingly connected to the support platform 12 in accordance with the principles of the present invention and in the manner hereinafter to be described.

In order to provide for fine manual rotational adjustment of the shafts 90 and 106, and hence fine rotational adjustment of the platform 12, a fine adjustment assembly is provided in the housing section 24. As best seen in FIGURE 3, a suitable gear member 116 is mounted on the shaft 90 adjacent the coupling mechanism 91. The gear 116 is drivingly connected to another gear 118 which is fixedly secured on a transversely extending adjustment shaft 120, the shaft 120 being rotatably mounted within suitable anti-friction bearing assemblies 122 and 124 which are disposed within wall portions 126 and 128, respectively, of the housing section 24. The shaft 120 extends through the wall portion 128 and also through a lubricant seal which is similar in construction to the aforedescribed seal 96. The bearing assembly 124 and fluid seal are secured within the housing portion 128 by means of a suitable retaining plate 131 and screws, bolts, or the like 132. The shaft 120 is provided with a drive coupling 134 on one end thereof which is secured to the shaft 120 by means of a suitable set screw or the like 136. The coupling 134 is also secured by means of a set screw 138 to a shaft 140 that extends through a wall portion 142 of the housing section 24 and is rotatably mounted therein by means of an anti-friction bearing assembly 144 secured to the portion 142 by a retaining plate 146 and screws, bolts or the like 148. A knurled adjustment knob 149 is fixedly secured to the outer end of the shaft 140 to facilitate manual rotation thereof. It will be seen that upon proper rotation of the knob 149, the shafts 140 and 120 will rotate, resulting in rotation of the shafts 90 and 106, with the further result that the platform 12 will rotate through the drive means later to be described. The gears 116, 118 may be selected such that rotation of the knob 149 will result in a predetermined amount of rotation of the platform 12. With this construction, the platform 12 may be rotated to an approximate position through the drive motor M and may thereafter be precisely positioned through manual rotation of the knob 149.

In accordance with the principles of the present invention, instead of the drive shaft 106 being drivingly connected directly to the rotatable platform 12, which might result in some eccentricity being imparted to the true axis of rotation of the platform 12 as the same is being rotated or driven, the shaft 106 is drivingly connected to the platform 12 by means of an annular ring gear 150 which is rotatably mounted coaxially of and directly below the platform 12. The gear 150 is formed with a multiplicity of radially outwardly extending gear teeth 152 which are selectively engageable with a worm gear 153 mounted on an intermediate section of the shaft 106. The ring gear 150 is rotatably mounted on an anti-friction bearing assembly 156 comprising an inner race 158, an outer race 160, a plurality of ball bearings 162 and a bearing cage 164. The outer race 160 of the assembly 156 is fixedly secured to the ring gear 150 by means of an annular retaining plate 165 which is mounted on the lower side of the gear 150 and rigidly secured thereto by means of screws, bolts or the like 166. The inner race 158 is fixedly secured to a central portion 167 of the housing section 22 by means of an annular retaining ring 168 that is secured to the portion 167 by screws 169. It will be noted that the ring gear 150 is rotatably supported completely independently of the platform 12.

Referring now in detail to FIGURES 2 and 4, the ring gear 150 is drivingly connected to the central hub member 72 and hence to the platform 12 by means of a novel keyway arrangement which prevents the gear 150 from causing any eccentricity of the true rotational axis of the platform 12. In particular and as best shown in FIGURE 4, mounted on the upper surface of the ring gear 150 is a generally rectangular shaped keyway member 170 which extends radially of the ring gear 150 and is fixedly secured thereto by means of a suitable screw, bolt or the like 172. The top of the keyway member 170 is adapted to be received within a radially extending rectangular shaped recess 174 formed on the lower side of an outer peripheral portion of the hub member 72, as illustrated. The keyway is preferably received within the recess 174 in a tight slip fit for the following reason.

From a practical standpoint, it is virtually impossible to construct and operatively mount the support platform 12 and ring gear 150 in a manner such that the true rotational axes thereof are always exactly colinear. Accordingly, if the gear 150 is rigidly secured to the hub member 72, as the gear 150 and platform 12 rotate, binding will occur between the gear 150 and platform 72, resulting in a certain amount of eccentricity being imparted to the rotational axis of the platform 12, with the further result that the angle measurement of an object on the platform 12 may be slightly erroneous; however, since the keyway 170 is received within the recess 174 in a tight slip fit, at such time as there is any misalignment between the true rotational axes of the ring gear 150 and support platform 12, the keyway 170 will move slightly in a radial direction with respect to the recess 174 to prevent any binding between the gear 150 and platform 12, thereby obviating the possibility of any eccentricity being imparted to the rotational axis of the platform 12. Additionally, the screw, bolt or the like 172 is preferably not completely tightened so that the keyway 170 may pivot slightly relative to the ring gear 150 to further obviate the possibility of any binding between the platform 12 and ring gear 150. By virtue of the fact that the keyway member 170 and recess 174 extend radially of the rotational axes of the ring gear 150 and hub member 172, the keyway 170 will function to effectively prevent any eccentricity from being transmitted to the support platform 12 in all rotative positions of said platform 12.

Means for accurately sensing the rotational position of the platform 12 may be provided by any one of a variety of devices known in the art, and by way of example, a precision angle sensing device distributed under the trade name "Inductosym" is shown and described herein, although it will be apparent that this device is not deemed necessary to the operation of the rotary table 10 of the present invention and that it is briefly described herein merely for the purpose of describing an exemplary means for precision angle measure. The "Inductosym" unit comprises a pair of discs, one of which is in the form of a rotor 180 that is secured to a radially outwardly extending rotor support plate 182 mounted on a downwardly extending central portion of the hub member 72 by means of suitable screws, bolts or the like 184. The other disc is in the form of a stator 186 which is mounted on the top of a plate 188 that is fixedly secured by suitable screws, bolts or the like 189, to a central portion of a housing section 22. It will be seen that upon rotation of the platform 12, the rotor 180 will rotate relative to the stator 186. The rotor 180 is provided with a large number of conductors extending circumferentially of the plate 182, and the stator 186 is composed of several sets or sectors of conductors which are divided into groups connected in series. Alternate sectors form one group or phase. The two groups or phases are displaced from each other by one-half pole or ¼ cycle of the rotor 180 and they are thus in spaced quadrature. The patterns on both the rotor 180 and the stator 186 are so designed that the coupling between the two units is accurately sinusoidal with angular position, which is accomplished by making use of the various parameters of the pattern dimensions. A gear train assembly, generally designated 190, is drivingly connected to a central shaft member 194 that is secured to the hub member 72 along the rotational axis thereof, the gear train 192 being connected to suitable incoders 196 and 198 which are communicable with associated digital or similar type readout devices (not shown) which are adapted to give a digital or numerical representation of the arc angle measurement values.

Suitable means 200 for supplying lubricant to the various bearing assemblies incorporated in the rotary table 10 of the present invention are shown in FIGURE 2, along with various other component parts such as an oil pressure gauge 202, a bottom cover plate 204 and the like, all of which parts are ancillary to the description and scope of the present invention.

While it will be apparent that the exemplary embodiment illustrated herein is well calculated to fulfill the objects above stated, it will be appreciated that the rotary table 10 is susceptible to modification, variation and change without departing from the proper scope of the present invention.

What is claimed is:
1. In a device for supporting a workpiece for rotation, a housing structure,
a support platform adjacent the upper side of said housing,
first anti-friction bearing means supported by said housing for rotatably supporting said support platform for rotation about a first generally vertically extending axis,
a hub member fixedly secured to the lower side of said support platform and depending downwardly within said housing,
a ring gear member disposed interiorly of said housing adjacent the lower side of said hub member,
drive means for effecting rotational movement of said ring gear member,
second anti-friction bearing means carried by said housing for rotatably supporting said ring gear member about a second generally vertically extending axis arranged substantially coaxially of said first mentioned axis,
said second anti-friction bearing means being completely independent of said first bearing means and said platform supported thereby, and
a radially extending keyway member and means defining a radially extending keyway receiving recess disposed between the upper side of said ring gear member and the lower side of said hub member and located radially outwardly from said first and second rotational axes,
said keyway means being received within said recess in a tight-slip fit, whereupon rotation of said ring gear member in response to actuation of said drive means, rotational movement will be imparted to said support platform, with said keyway means moving radially within said recess to prevent any eccentricity between said first and second rotational axes being transmitted from said ring gear member to said support platform.
2. The invention as set forth in claim 11 wherein said keyway means if fixedly secured to the upper side of said gear member.

References Cited

UNITED STATES PATENTS 3,270,423  9/1966  Birrell et al.
3,312,510  4/1967  Brehm.

SAMUEL S. MATTHEWS, Primary Examiner